(12) United States Patent
Mead et al.

(10) Patent No.: US 6,836,592 B2
(45) Date of Patent: Dec. 28, 2004

(54) METHOD AND APPARATUS FOR FIBER BRAGG GRATING PRODUCTION

(75) Inventors: Roy M. Mead, Edmonds, WA (US); Charles I. Miyake, Kirkland, WA (US)

(73) Assignee: Aculight Corporation, Bothell, WA (US)

(*) Notice: Subject to any disclaimer, the term of this patent is extended or adjusted under 35 U.S.C. 154(b) by 199 days.

(21) Appl. No.: 10/038,099

(22) Filed: Oct. 29, 2001

(65) Prior Publication Data

US 2003/0007730 A1 Jan. 9, 2003

Related U.S. Application Data

(60) Provisional application No. 60/276,651, filed on Mar. 16, 2001, provisional application No. 60/269,152, filed on Feb. 15, 2001, provisional application No. 60/269,150, filed on Feb. 15, 2001, and provisional application No. 60/249,989, filed on Nov. 20, 2000.

(51) Int. Cl.[7] .............................. G02B 6/34; G02B 6/26
(52) U.S. Cl. ........................................ 385/37; 385/39
(58) Field of Search ............................ 385/37, 39, 147

(56) References Cited

U.S. PATENT DOCUMENTS

| | | | | |
|---|---|---|---|---|
| 5,291,503 A | * | 3/1994 | Geiger et al. | 372/21 |
| 5,776,674 A | * | 7/1998 | Ulmer | 435/6 |
| 5,901,162 A | * | 5/1999 | Alcock et al. | 372/18 |
| 6,112,553 A | * | 9/2000 | Poignant et al. | 65/41 |
| 6,297,894 B1 | * | 10/2001 | Miller et al. | 359/35 |
| 6,307,626 B1 | * | 10/2001 | Miles et al. | 356/301 |
| 6,310,996 B1 | * | 10/2001 | Byron | 385/37 |
| 6,404,956 B1 | * | 6/2002 | Brennan et al. | 385/37 |
| 6,456,762 B1 | * | 9/2002 | Nishiki et al. | 385/37 |
| 6,528,239 B1 | * | 3/2003 | Starodubov | 430/321 |
| 6,574,255 B1 | * | 6/2003 | Caprara et al. | 372/45 |

* cited by examiner

*Primary Examiner*—John D. Lee
*Assistant Examiner*—Tina M Lin
(74) *Attorney, Agent, or Firm*—Patent Law Office of David G. Beck

(57) ABSTRACT

A wide variety of Fiber Bragg writing devices comprising solid state lasers are provided. The solid state lasers emit moderate peak-power output beams which are suitable for efficient production of fiber Bragg gratings without causing embrittlement of the optical waveguide. These solid state lasers generate output beams with wavelengths of approximately 240 nm, in order to match the primary absorption peak in the ultraviolet range for a typical optical waveguide. In some embodiments, the solid state lasers comprise Ti:sapphire lasers which are tuned to produce fundamental wavelengths which are frequency-multiplied. In other embodiments, the output beam of a Ti:sapphire laser is mixed with a harmonic beam from a pump laser. Some embodiments output the third harmonic of a fundamental beam.

11 Claims, 10 Drawing Sheets

US 6,836,592 B2

METHOD AND APPARATUS FOR FIBER BRAGG GRATING PRODUCTION

CROSS-REFERENCES TO RELATED APPLICATIONS

This application claims priority based on the following U.S. Provisional Patent Application Ser. Nos., the disclosures of which are incorporated herein by reference for all purposes: 60/249,989, filed Nov. 20, 2000; 60/269,150, filed Feb. 15, 2001; 60/269,152, filed Feb. 15, 2001; and 60/276,651, filed Mar. 16, 2001.

FIELD OF THE INVENTION

The invention relates generally to the field of optical waveguide manufacturing and particularly to the processing of optical fibers to create fiber Bragg gratings.

BACKGROUND OF THE INVENTION

Fiber Bragg gratings (FBG's) are portions of optical waveguides, such as optical fibers, which have been processed to reflect and transmit specific wavelengths. The waveguides are typically germanium-doped silica fibers and for the purposes of this description will be referred to as "fibers" or "optical fibers." However, it should be understood that these terms are being used in a generic sense to mean any type of optical waveguide.

Producing FBG's involves exposing the fiber to ultraviolet light, the intensity of which varies between light and dark along the length of the fiber. The light and dark bands of exposure are placed along the fiber with spacing comparable to the wavelength of light to be reflected by the fiber in operation. The ultraviolet light induces changes in the index of refraction of the fiber, producing an index grating along the length of the fiber.

A light source used for exposure of a fiber to make FBG's must provide light within specific ranges of wavelengths in the ultraviolet portion of the spectrum. A typical fiber's primary wavelength range for absorption peaks near 240 nm, and wavelengths differing from the peak by more than about 10 nm are significantly less effective. Even at the peak wavelength, only a small fraction of the laser power is absorbed, so it is highly desirable for the light source to provide light at a wavelength near the absorption peak.

Unfortunately, the current sources of ultraviolet light used for FBG production have various drawbacks. Most current production systems for FBG's use either KrF excimer lasers emitting at 248 nm, or frequency-doubled argon-ion lasers at 244 nm, to expose the fibers. KrF excimer lasers can produce high average powers, which facilitates processing, but they have serious disadvantages. They require toxic, corrosive gases for operation, have high operating and maintenance costs, and produce short duration (~50 ns), low repetition rate (<1000 Hz), high peak output power (~1 MW) ultraviolet pulses. The high peak output powers cause damage to the fibers, weakening them and making them susceptible to fracture. The alternative continuous wave ("cw") argon ion lasers suffer high operating costs and produce weak output powers of one-half watt or less, leading to poor production throughput.

Several other types of lasers, including argon-fluoride and xenon-chloride excimer lasers and flashlamp-pumped lasers, have also been applied to FBG production. However, the argon-fluoride and xenon-chloride excimer lasers suffer from disadvantages similar to those of KrF excimer lasers. Flashlamp-pumped lasers provide some operational improvements compared to excimer lasers, but also generate high peak power pulses which damage the optical fibers.

Other lasers have also been used in laboratory demonstrations of FBG production. Frequency-doubled copper vapor lasers at 255 nm have been used, though their output wavelength is slightly too long to be optimal. Frequency-doubled liquid dye lasers have been tuned to the 240 nm region for FBG fabrication, but such lasers are impractical for large-scale industrial production, since they require very frequent changes of the liquid dye solution to maintain operation.

Solid-state lasers are being increasingly utilized for materials processing applications, due to their reliability and reasonable operating costs. Solid state lasers would be of great interest for FBG production, but heretofore have not been usable because they have not been able to produce the required wavelengths.

SUMMARY OF THE INVENTION

In order to address the shortcomings in prior art devices for making FBG's, the present invention discloses a variety of solid state lasers which generate moderate peak-power radiation at wavelengths suitable for FBG production. These lasers are used in combination with various devices for producing FBG's at a rate which exceeds that of current production devices. Moreover, the FBG's are produced without significant damage to the fibers, without exposing workers and equipment to toxic and corrosive gases and without the frequent maintenance required for other FBG systems.

According to some embodiments of the present invention, an apparatus for producing an FBG in an optical fiber includes a solid state laser comprising at least one Ti:sapphire laser medium for producing an output laser beam having a wavelength in the range of approximately 230 to 250 nanometers and means for using the output laser beam to produce the diffraction pattern on the optical fiber.

Other embodiments of the present invention includes a solid state laser for producing a third harmonic laser beam having a wavelength in the range of approximately 230 to 250 nanometers and means for using the third harmonic laser beam to produce an FBG in an optical fiber. Some of these embodiments include a Ti:sapphire laser medium and some do not.

In one embodiment, the output beam from one of the foregoing embodiments is used to illuminate a proximity mask which causes a diffraction pattern to be imaged onto the fiber. In an alternative embodiment, a diffraction pattern from a phase mask is imaged onto a waveguide, such that a portion of the FBG may have a different period than that of the corresponding groove of the phase mask.

In another embodiment, a holographic technique is employed: a beam splitter splits the output beam into two beams and interference between these two beams is used to create the FBG.

In still another embodiment, the output beam illuminates a phase mask interferometer which produces the FBG. According to several embodiments, the phase mask interferometer has mirrors for reflecting rays diffracted from the phase mask. According to one such embodiment, an actuator controls the lateral movement of at least one mirror. According to one embodiment, the distance between a first mirror and a direct ray is less than the distance between a second mirror and the direct ray. According to another embodiment, one or more mirrors may be rotated by an actuator. In some embodiments, the fiber is kept parallel to grating during FBG production, but in other embodiments the fiber is inclined with respect to the fiber. Moreover, the output beam may illuminate a single portion of the phase mask or may be scanned along the phase mask.

According to yet another embodiment, any of the previously described light sources illuminates a Lloyd mirror interferometer for producing FBG's.

According to other embodiments, a prism interferometer illuminated by any of the previously described light sources produces FBG's. According to one such embodiment, the prism interferometer includes a right angle prism. According to another such embodiment, an actuator rotates a prism to tune the Bragg wavelength of an FBG.

DESCRIPTION OF THE SPECIFIC EMBODIMENTS

A. Fabrication of Bragg Gratings

There are two basic methods of generating the necessary alternating light and dark regions of an FBG, with many variations of each method. The first is a "holographic" method, wherein two ultraviolet beams are caused to interfere with one another. The resulting interference pattern is projected onto the germanium-doped portion of the fiber. The second basic method is noninterferometric and involves exposure of the fiber to periodic ultraviolet ("UV") radiation.

1. Holographic Methods

Figure 1:
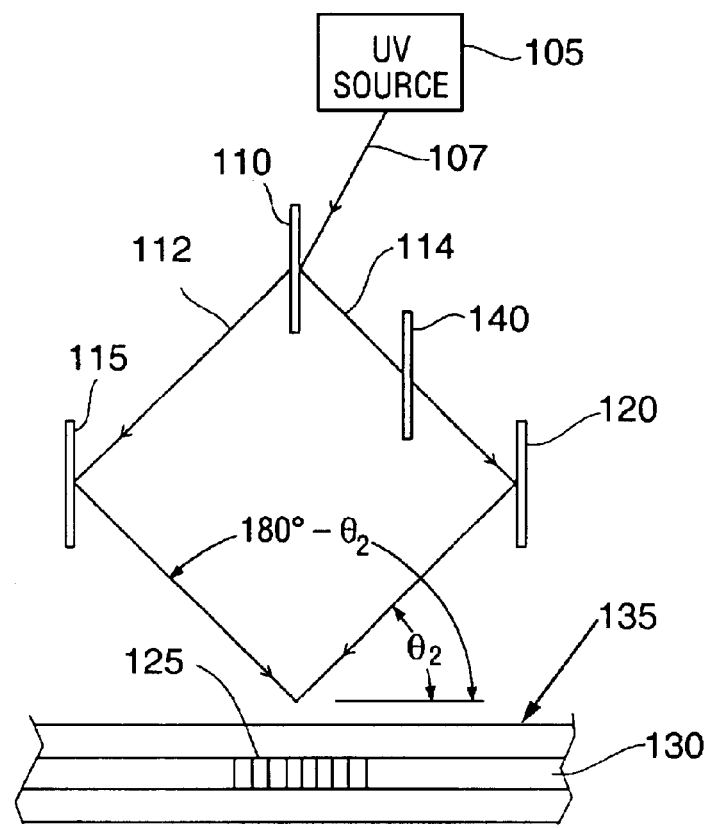
FIG. 1 is a schematic depiction of an FBG writing system which uses optics to produce an interference pattern on an optical fiber.

A basic holographic method is shown schematically in FIG. 1. There, ultraviolet source 105 (typically some form of laser) generates beam 107, which is split into beams 112 and 114 by beam splitter 110. For low-coherence sources, it is advantageous to equalize the path lengths of beams 112 and 114. In FIG. 1, these path lengths are equalized by disposing compensating plate 140 in the path of beam 114. Beams 112 and 114 reflect from mirrors 115 and 120, respectively, and are thereby directed to create interference pattern 125 in doped portion 130 of optical fiber 135. This method is described, for example, in U.S. Pat. No. 4,725,110 (see, for example, col. 1, line 56 through col. 2, line 68 and the referenced figures), the teachings of which are hereby incorporated by reference.

2. Proximity and Projection Masking Techniques

As noted above, the second basic method is noninterferometric and involves exposure of the fiber to periodic ultraviolet UV radiation. The periodic UV radiation can be generated, for example, by having the fiber and a pulsed UV source move relative to one another. Alternatively, the periodic UV radiation can be generated using a spatially periodic grating mask (also known as a "phase mask" or "phase grating") that is imaged or photo imprinted onto the fiber. Phase masks are typically made by etching grooves into a UV-transmitting silica plate using an electron beam, or by holographic exposure.

Figure 2:
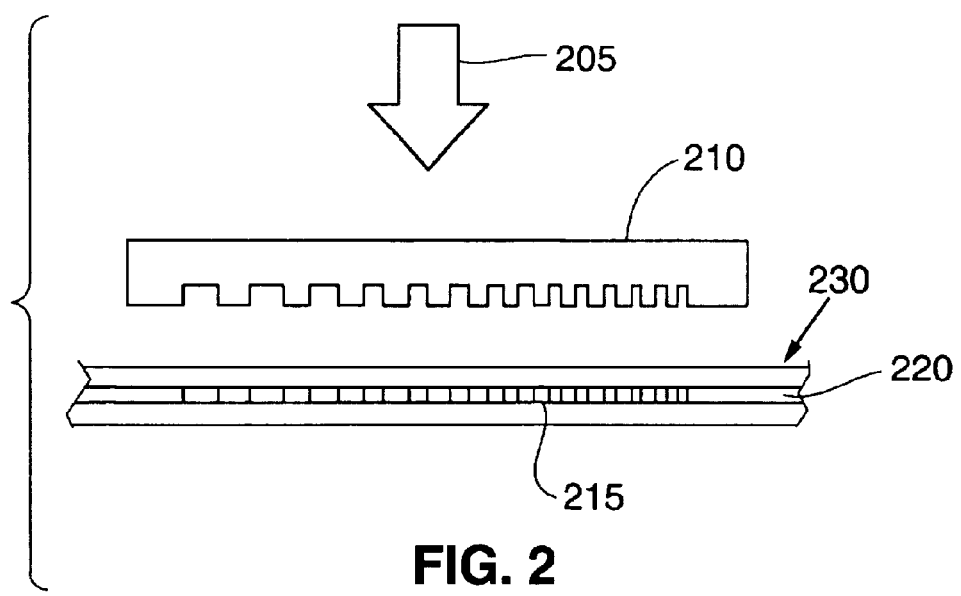
FIG. 2 depicts a method of creating an FBG using a mask.

A method of using a phase mask as a "proximity mask" is schematically shown in FIG. 2. Ultraviolet beam 205 projects an image of mask 210, producing FBG 215 in doped portion 220 of fiber 230. Mask 210 is a "chirped" grating, in which the spacing of the grooves in mask 210 varies from end to end. In another embodiment, mask 210 is not chirped, but instead has grooves with equal widths.

In an alternative embodiment, a projection masking technique may be employed by disposing imaging optics between mask 210 and fiber 230. By using optics which magnify or reduce the spacing of the grooves in mask 210, an FBG maybe formed with a period (or range of periods) which is different from that of mask 210.

3. Phase Mask Interferometers

Phase masks are versatile elements and may be used in combination with various devices for producing FBG's. For example, a phase mask may be used in place of beam-splitter 110 in the holographic device shown in FIG. 1.

Figure 3:
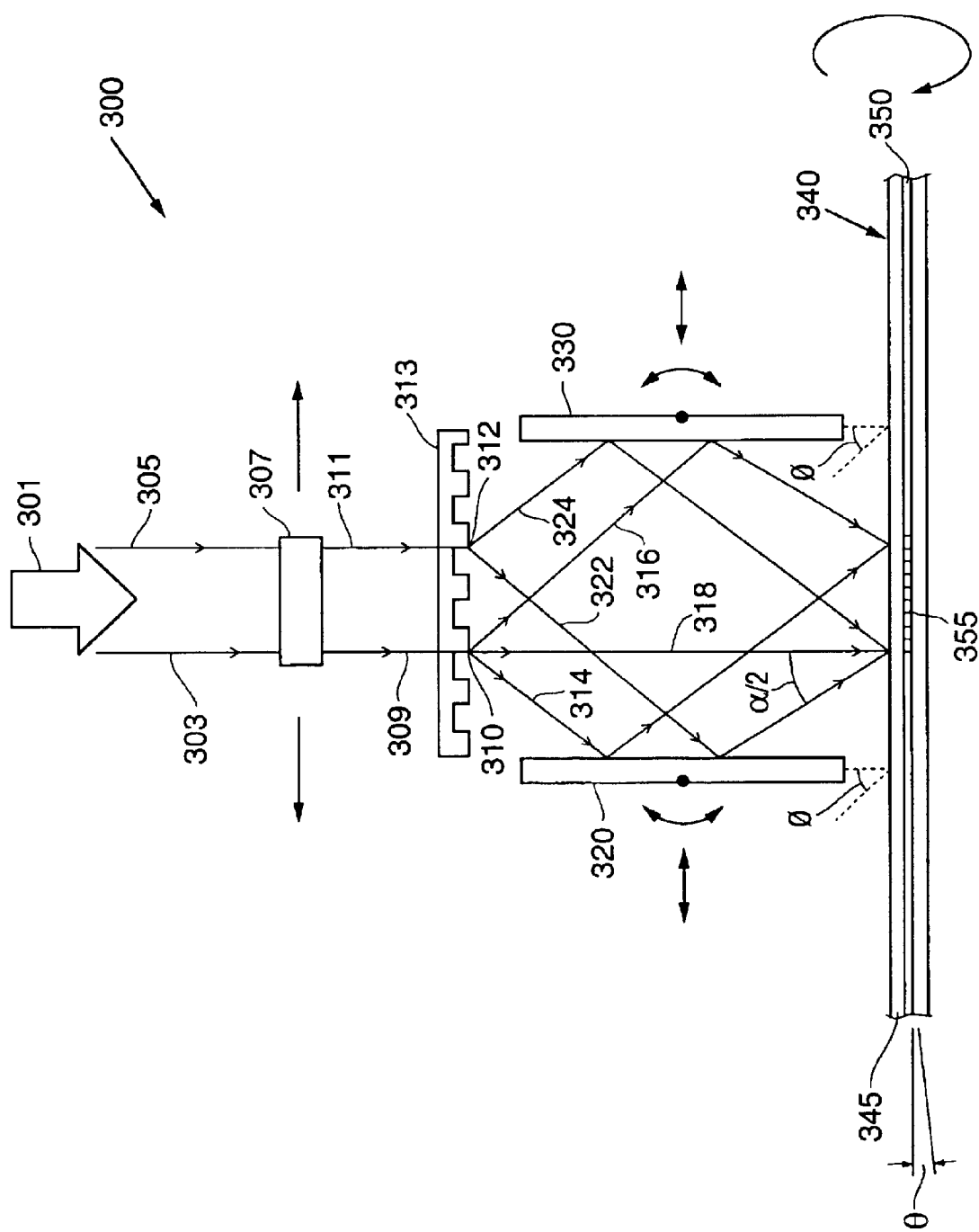
FIG. 3 illustrates a phase mask interferometer.

A phase mask may more advantageously be used in a "phase mask interferometer," in which a phase mask is used both as a beam-splitter and as a wavelength-defining element. FIG. 3 depicts a simplified version of phase mask interferometer 300. UV rays 303 and 305, which are illustrative of a plurality of rays comprising input beam 301, illuminate lens 307. Lens 307 directs rays 309 and 311 to diffraction points 310 and 312, respectively, of mask 313. Mask 313 is preferably a single-phase mask. Rays 314 and 316 are exemplary rays diffracted from diffraction point 310, and rays 322 and 324 are exemplary rays diffracted from diffraction point 312. Rays 314 and 322 are reflected by mirror 320 to fiber 340. Rays 316 and 324 are reflected by mirror 330 to fiber 340. Beams 314 and 316 intersect at doped portion 350 of fiber 340, as do rays 322 and 324, producing portions of FBG 355.

The angle between incident ray 322 and the normal to fiber 340 is known as "half-writing angle" $\alpha/2$. The Bragg wavelength $\lambda_{Bragg}$ may be expressed as a function of the half-writing angle $\alpha/2$ as follows:

$$\Delta\lambda/\lambda_{Bragg} = -(\Delta\alpha/2) \text{ cotangent } (\alpha/2) \qquad \text{Equation (1)}$$

The derivation of Equation (1) is explained in numerous publications and will not be repeated here. (See, e.g., Kayshap, *Fiber Bragg Gratings* (Academic Press 1999) at pp. 58–63.)

Considering Equation (1), it may be seen that phase mask interferometer 300 may be highly tunable if mirrors 320 and 330 can be moved laterally or if the distance between mask 313 and fiber 340 can be altered: either of these adjustments changes the half-writing angle and therefore changes the Bragg wavelength. Therefore, in one preferred embodiment, phase mask interferometer 300 includes an actuator and a controller for adjusting the separation between mask 313 and fiber 340, thereby changing the half-writing angle and tuning the Bragg wavelength. In another preferred embodiment, phase mask interferometer 300 includes an actuator for laterally moving at least one of mirrors 320 and 330, thereby tuning the Bragg wavelength.

It is well known by those skilled in the art that it is often advantageous to enhance the +1 and −1 orders of the interference pattern and to suppress "zero order" energy, such as that from direct ray 318. This is so because even a low-intensity zero order ray can interfere with the +1 and −1 orders, which makes FBG 355 have a period which is the same as that of mask 313. Therefore, in a method according to yet another embodiment, only one of mirrors 320 and 330 is moved laterally. This causes rays 314, 316, 322 and 324 to interfere in a region which is laterally offset from zero order ray 318, which allows FBG 355 to be made without using a zero-order component of input beam 301.

Preferably, mirrors 320 and 330 may be rotated about one or more axes. In one embodiment, mirrors 320 and 330 are rotated such that rays 314, 316, 322 and 324 are reflected out of the plane of FIG. 3, and fiber 340 is positioned where the foregoing rays are directed. Accordingly, direct ray 318 is not incident on fiber 340 and zero-order energy is suppressed.

According to another embodiment, a slanted grating is produced in fiber 355 by positioning fiber 340 at an angle Θ with respect to direct ray 318.

In another preferred embodiment, phase mask interferometer 300 includes means for rotating fiber 340 around its long axis while being exposed to UV radiation.

In yet another preferred embodiment, phase mask interferometer 300 includes actuators for moving input beam 301 and lens 307 laterally along mask 313, as indicated by the arrows adjacent to mask 313 in FIG. 3. This scanning technique allows FBG 355 to be made relatively long. The quality of FBG's produced using a scanning technique depends on the precision with which mask 313 is manufactured.

Figure 4:
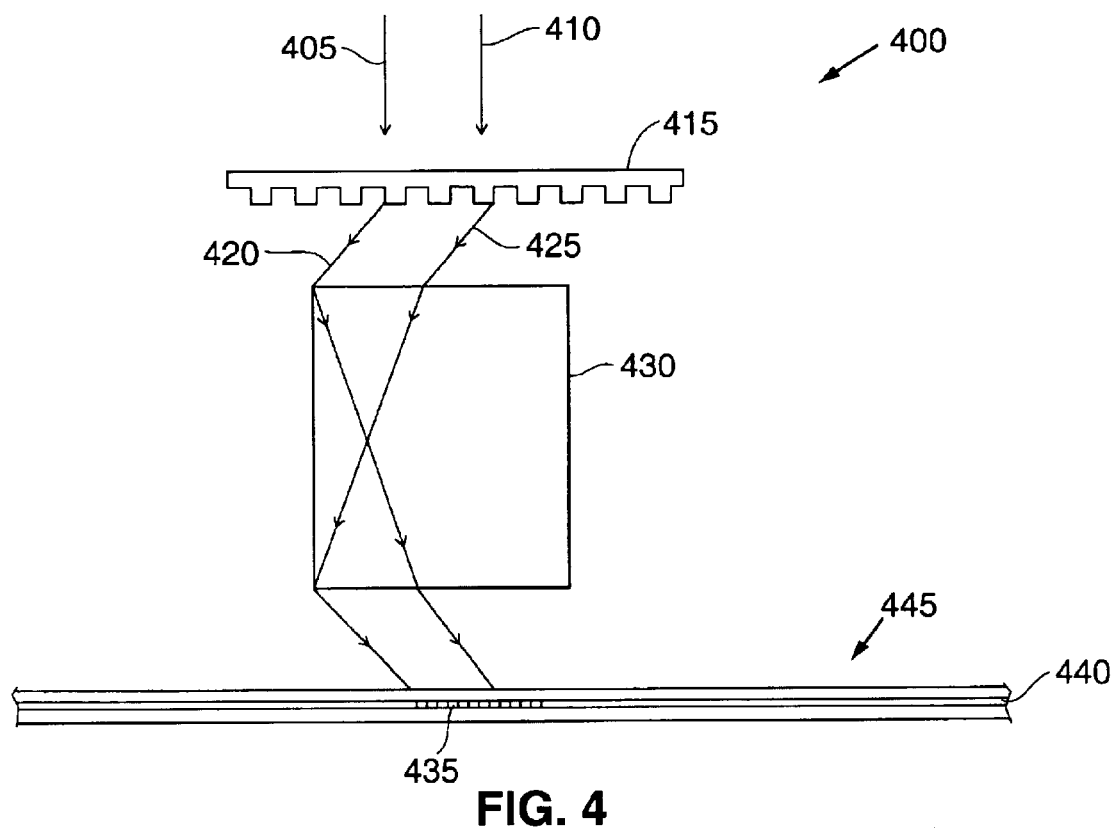
FIG. 4 illustrates a phase mask interferometer in which a block has replaced the mirrors of the interferometer shown in FIG. 3.

In the embodiment illustrated in FIG. 4, UV light rays 405 and 410 are incident upon phase mask 415. Diffracted rays 420 and 425 emitted from phase mask 415 are refracted by block 430 and produce FBG 435 in doped layer 440 of fiber 445. Block 430 replaces mirrors 320 and 330 of the device shown in FIG. 3 and provides stability to phase mask interferometer 400. Block 430 may be made of any convenient material, such as silica.

4. Lloyd Bragg Writer

Figure 5:
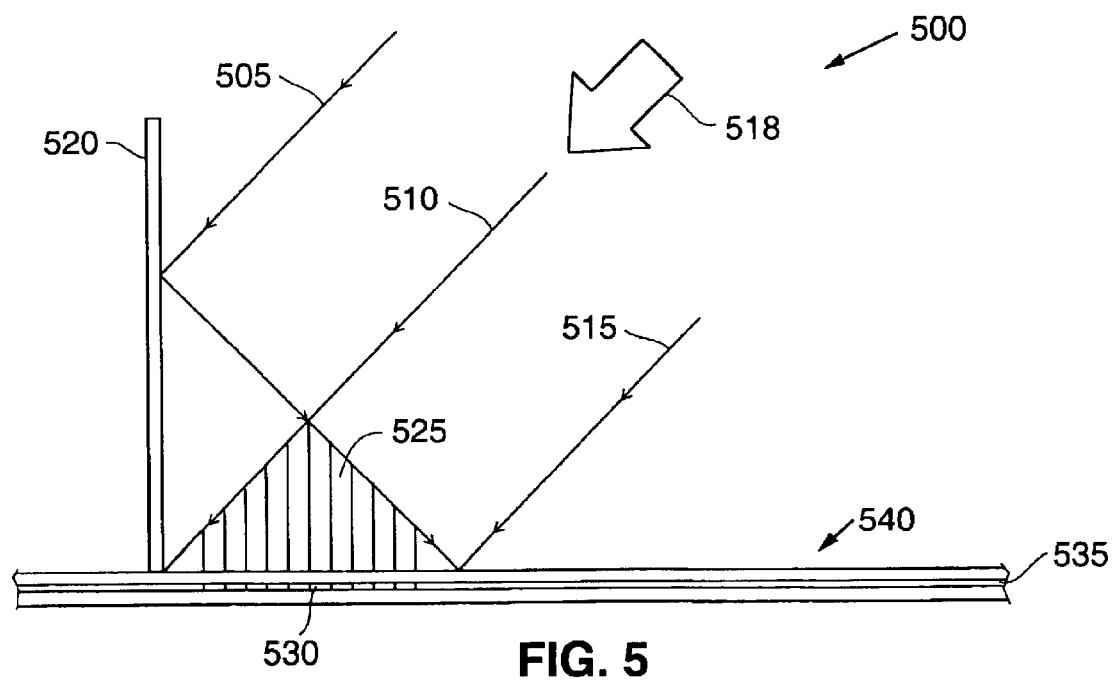
FIG. 5 illustrates a Bragg writer which uses a Lloyd mirror to create the necessary interference pattern.

Instead of splitting an incident beam and recombining the beam using mirrors, FBG's may be produced using a single "Lloyd" mirror, as shown in Lloyd Bragg writer 500 of FIG. 5. Input rays 505, 510 and 515 are parallel to one another and are examples of the many ray paths of input beam 518. Input ray 505 is reflected from mirror 520 and interferes with ray 510. The interference between rays such as 505 and 510 is shown schematically by the vertical lines in zone 525. This interference pattern causes FBG 530 in doped layer 535 of fiber 540.

Input beam 518 should have a coherence length equal to at least the path difference introduced by the "fold" in the beam. Preferably, the intensity profile and coherence properties should be relatively constant across input beam 518. Fiber 540 is preferably oriented perpendicular to mirror 520.

5. Prism Interferometers

Figure 6:
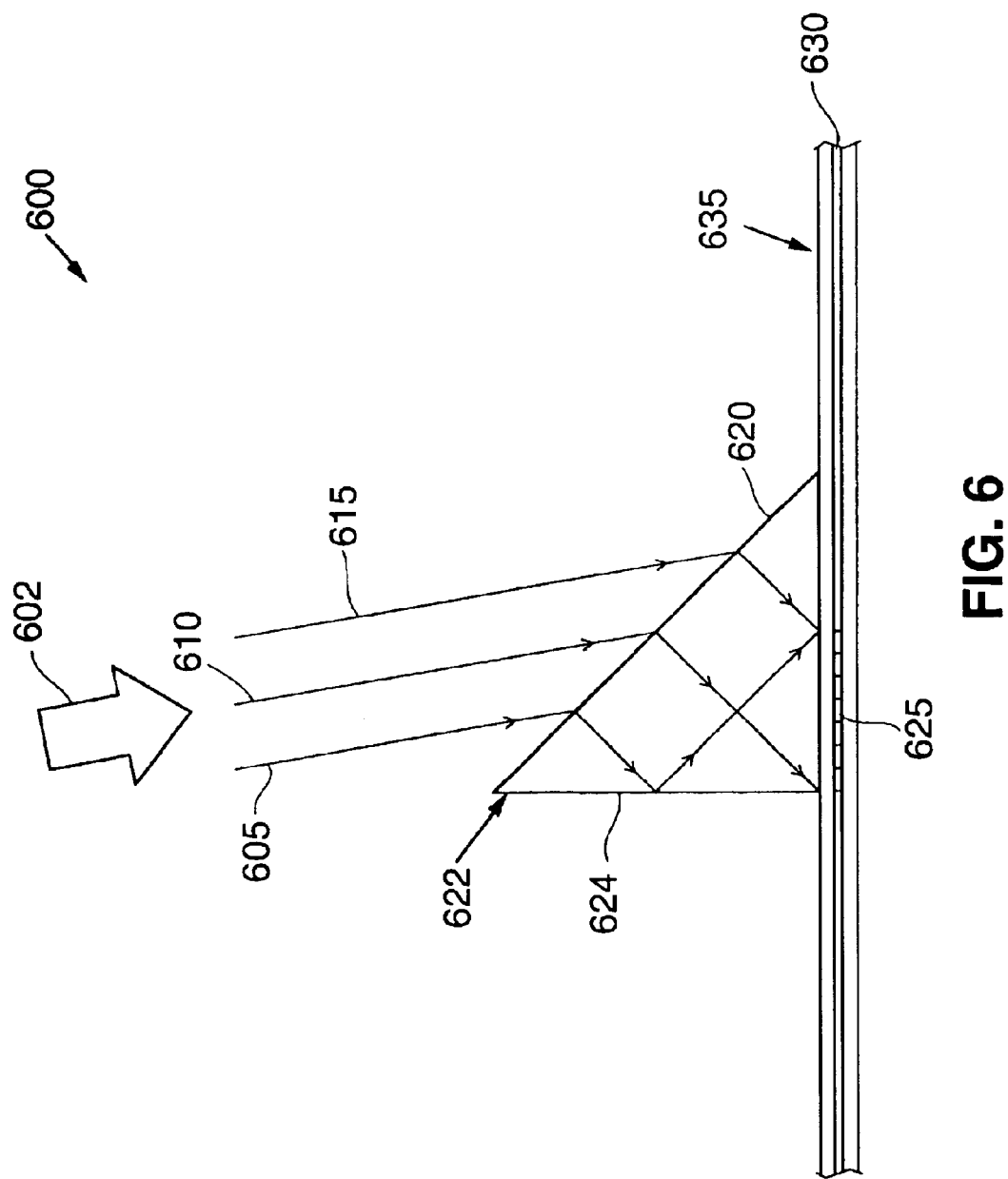
FIG. 6 illustrates a prism interferometer.

A prism interferometer operates in a similar fashion to a Lloyd mirror, except that a prism replaces the mirror. Referring to FIG. 6, selected paths of input beam 602 are shown by representative rays 605, 610 and 615. Ray 605 is refracted by inclined face 620 of prism 622, then reflected by vertical face 624 of prism 622 to interfere with rays 610 and 615, which are only refracted. The resulting interference pattern creates FBG 625 in doped portion 630 of fiber 635.

Prism 622 is preferably a right-angled prism such that input beam 602 is bisected. Prism 622 may be made of any convenient material, but is advantageously made from UV-transmitting silica. Inclined face 620 is advantageously coated by antireflection material. Prism interferometer 600 is intrinsically more stable than Lloyd Bragg writer 500, because the rays of the former device are reflected and diffracted inside prism 622 instead of in air. One embodiment of prism interferometer 600 includes an actuator for rotating prism 622, thereby tuning the Bragg wavelength of FBG 625.

B. Light Sources for FBG Production

Figure 7:
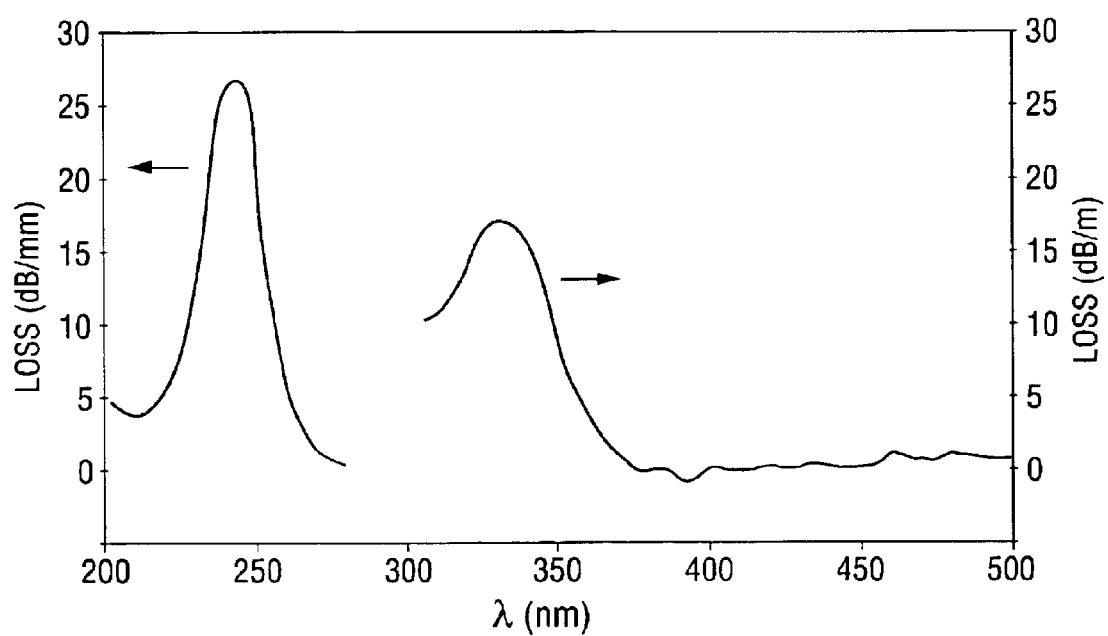
FIG. 7 is a graph of the loss spectrum of a typical germanium-doped silicate fiber.

FIG. 7 is a composite graph which indicates the loss spectrum of a typical telecommunications fiber between 200 and 500 nm. The measured fiber was a single-mode fiber with a composition of 3-mol. % germanium. The data between 200 and 275 nm were obtained using a V-groove splicing technique and are plotted with reference to the scale on the left margin of the graph. The data between 300 and 500 nm were obtained by using a standard cutback technique and are plotted with reference to the scale on the right margin of the graph.

The most well-developed diode-pumped lasers available today use Nd or Yb doped into various hosts to provide light having wavelengths of around 1.03–1.07 $\mu$m. Such lasers are typically tripled, quadrupled, or quintupled to provide ultraviolet output. Unfortunately, the wavelengths generated by these processes yield final outputs well away from the 240 nm required for the most efficient FBG production.

For example, if the fundamental frequency of a 1.03 $\mu$m (1030 nm) diode-pumped laser were quadrupled, the resulting wavelength would be 257.5 nm. If the fundamental frequency were quintupled, the resulting wavelength would be 206 nm. Referring to FIG. 7, it is apparent that neither of these wavelengths would be suitable for efficient FBG production. If the fundamental frequency of a 1.07 $\mu$m (1070 nm) diode-pumped laser were quadrupled, the resulting wavelength would be 267.5 nm. If the fundamental frequency were quintupled, the resulting wavelength would be 214 nm. These wavelengths are even further from 240 nm than the harmonics of the 1.03 $\mu$m diode-pumped laser and therefore even less desirable for FBG production.

The following paragraphs describe various devices and methods for producing suitable radiation for the production of FBG's. Any of these light sources may be used with all of the previously-described Bragg writers.

1. Wavelength Converters Which Include a Ti:Sapphire Laser

A Ti:sapphire laser is tunable from about 700 nm to 900 nm. There are a variety of possible methods for employing a Ti:sapphire laser to generate radiation near 240 nm for FBG production, several of which are described in detail below.

Some preferred embodiments include a frequency-doubled pump laser producing radiation at wavelengths slightly longer than 0.5 micron, which pumps a Ti:sapphire laser to oscillate at about 720 nm.

Figure 8:
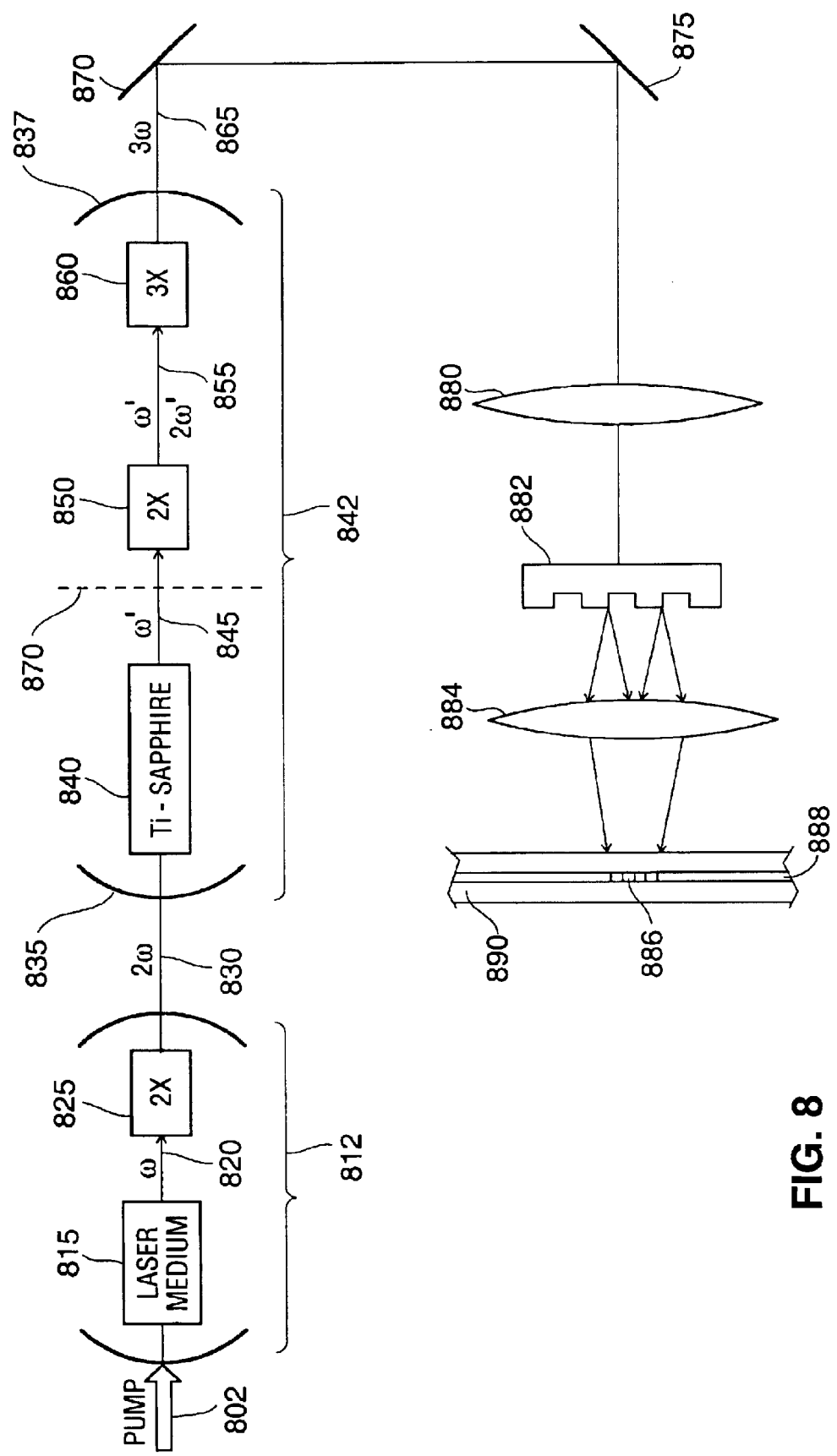
FIG. 8 illustrates an embodiment of the present invention which outputs a third harmonic beam of a Ti:sapphire laser.

One such laser is illustrated in FIG. 8. Pump beam 802 pumps laser medium 815, which is disposed within resonator 812, defined by mirrors 805 and 810. Laser medium 815 emits fundamental beam 820 at a wavelength of approximately 1 micron. Doubler crystal 825 produces second harmonic beam 830 at a wavelength of approximately 0.5 micron. In this embodiment, doubler crystal 825 is within resonator 812, but in other embodiments doubler crystal 825 is outside of resonator 812.

Second harmonic beam 830 is used to pump Ti:sapphire laser 840, which is tuned to produce fundamental beam 845 at approximately 720 nm. Ti:sapphire laser 840 comprises at least one Ti:sapphire crystal and preferably includes one or more elements (such as a diffraction grating, prism, etalon, or birefringent filter) for line-narrowing and tuning. Doubler crystal 850 partially converts fundamental beam 845 to second harmonic beam 855 and tripler crystal 860 mixes the frequencies of fundamental beam 845 and second harmonic beam 855 to produce output beam 865 at approximately 240 nm.

In some embodiments, the wavelength of Ti:sapphire laser 840 is coarsely tuned (on the order of tens of nm) by means of an actuator which controls one or more tuning elements (prisms, birefringent filters, or gratings) according to control signals from a controller. In some embodiments, the actuator is operated by a processor using a feedback loop, such that the angle of the tuning element is automatically adjusted according to a measured wavelength of output beam 865. In such embodiments, the processor controls the actuator such that an actual wavelength of output beam 865 is within a predetermined number of nanometers of a desired wavelength, as indicated by a control operated by a user.

In some embodiments, the wavelength of output beam 865 is fine-tuned (on the order of a nm or less) by a temperature controller or piezoelectric transducer attached to an etalon. In one such embodiment, the temperature controller is a thermoelectric cooler. In another such embodiment, the temperature controller is a heater. In some embodiments, the temperature controller is operated by a processor using a feedback loop, such that the temperature of the etalon is automatically adjusted according to a measured wavelength of output beam 865. In such embodiments, the processor controls the temperature controller such that an actual wavelength of the output beam 865 is within a predetermined number of nanometers of a desired wavelength, as indicated by a control operated by a user. Alternatively, the spacing or angle of an etalon may be adjusted by means of a piezoelectric transducer or a galvanometer actuator.

Output beam 865 is reflected by mirrors 870 and 875 to lens 880, which directs output beam 865 to phase mask 882. Output beam images phase mask 882 and the image is projected by lens 884 to create FBG 886 in doped portion 888 of waveguide 890.

In an alternative embodiment, mirror 870 is used to create subresonator 875 within resonator 842. Mirror 870 is highly transmissive of fundamental beam 845 and is highly reflective of second harmonic beam 855.

In one embodiment, laser medium 815 comprises an Nd:YLF laser crystal. However fundamental beam 820 may be produced by a variety of lasers, including diode-pumped or lamp-pumped Nd or Yb doped in a garnet (such as YAG) or fluoride (such as YLF) or vanadate ($YVO_4$).

Figure 9:
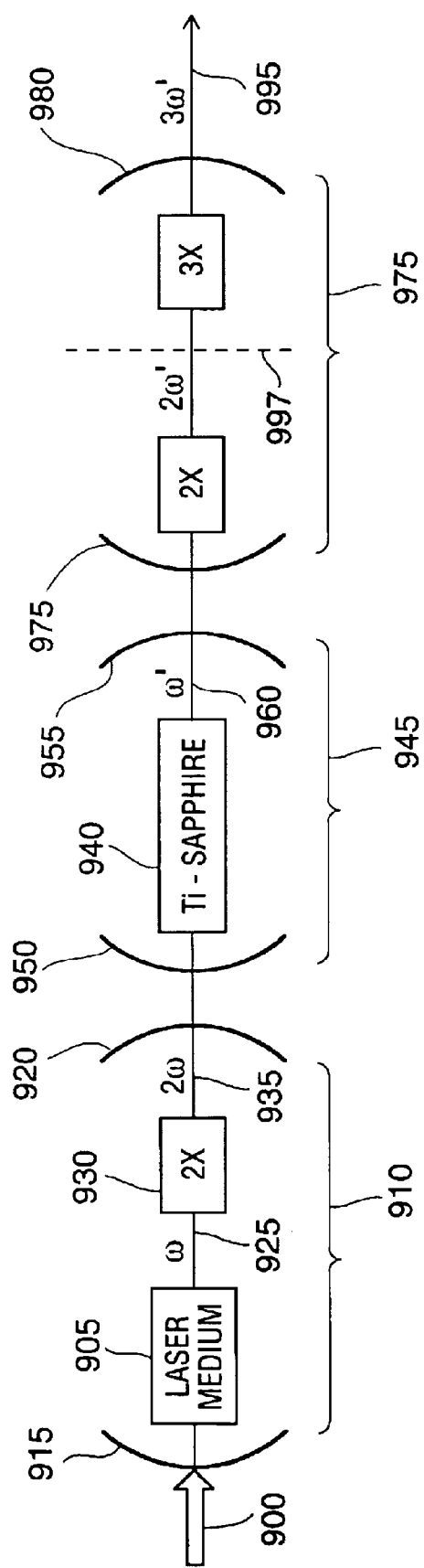
FIG. 9 illustrates an alternative embodiment of the present invention which outputs a third harmonic beam of a Ti:sapphire laser.

Laser 800 could be operated in either pulsed or continuous wave ("cw") mode. Using a cw laser, the nonlinear steps are preferably done in resonant cavities to increase the conversion efficiency. As illustrated in FIG. 9, the doubler crystal and the tripler crystal may be disposed outside of the resonator which contains the Ti:sapphire laser.

Suitable materials for doubler crystal 825 include LBO, KTP and its isomorphs, KDP and its isomorphs, potassium niobate (KNB), or lithium niobate (LNB), or periodic-poled crystals of KTP (PPKTP) or LNB (PPLN). Suitable materials for doubler crystal 850 include LBO, BBO, CLBO, and KDP and its isomorphs. Suitable materials for tripler crystal 860 include beta-barium borate ("BBO"), and cesium lithium borate ("CLBO").

Pump beam 900 pumps laser medium 905, which is disposed within resonator 910, defined by mirrors 915 and 920. Laser medium 905 emits fundamental beam 925 at a wavelength of approximately 1 micron. Doubler crystal 930 produces second harmonic beam 935 at a wavelength slightly longer than 0.5 micron. In this embodiment, doubler crystal 930 is within resonator 910, but in other embodiments doubler crystal 930 is outside resonator 910.

Second harmonic beam 935 is used to pump Ti:sapphire laser 940, which is situated within resonating cavity 945, defined by mirrors 950 and 955. As in the embodiments described with respect to FIG. 8, Ti:sapphire laser 940 includes the necessary tuning elements for producing fundamental beam 960 at approximately 720 nm. In one preferred embodiment, Ti:sapphire laser 940 includes one or more line-narrowing elements, such as a prism or an etalon. Fundamental beam 960 is input to doubler crystal 965, which is disposed within resonator 970, bounded by mirrors 975 and 980. Doubler crystal 965 partially converts fundamental beam 960 to second harmonic beam 985 and tripler crystal 990 mixes the frequencies of fundamental beam 960 and second harmonic beam 985 to produce output beam 995 at approximately 240 nm. Output beam 995 is used in one of the foregoing Bragg writing embodiments for FBG production.

In an alternative embodiment, mirror 997 is used to create subresonator 998 within resonator 970. Mirror 997 is highly transmissive of second harmonic beam 985 and is highly reflective of output beam 995.

Figure 10:
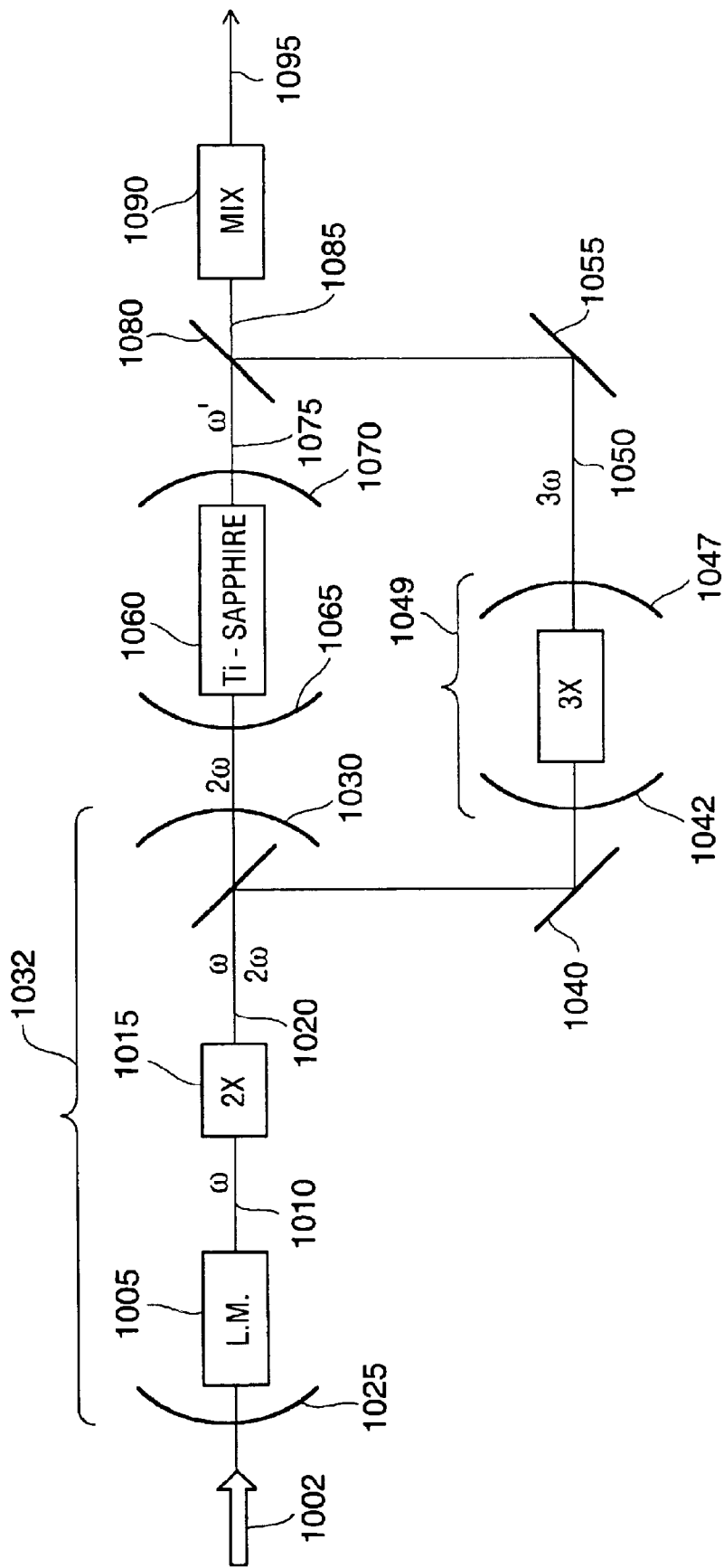
FIG. 10 illustrates an embodiment of the present invention in which a third harmonic beam of a pump laser is mixed with a fundamental beam of a Ti:sapphire laser.

In the embodiment shown in FIG. 10, the Ti:sapphire laser output near 740 nm is frequency-mixed with frequency-tripled laser output near 350 nm to produce output wavelengths near 240 nm. Pump 1002 stimulates laser medium 1005 to produce fundamental beam 1010. Doubler crystal 1015 partially converts fundamental beam 1010 to second harmonic beam 1020 to form combined beam 1022. Beam splitter 1035 reflects part of combined beam 1022 out of resonator 1032 to mirror 1040 and on to tripler crystal 1045, which produces third harmonic beam 1050 at about 350 nm.

In the embodiment shown in FIG. 10, tripler crystal 1045 is disposed outside of resonator 1032 and within resonator 1049, formed by mirrors 1042 and 1047. In other embodiments, tripler crystal 1045 is disposed within resonator 1032. In such embodiments, resonator 1049 may form a subresonator within resonator 1032. Alternatively, mirrors 1042 and 1047 may be omitted. In still other embodiments, beam splitter 1035 is disposed outside of resonator 1032.

Second harmonic beam 1020 pumps Ti:sapphire medium 1060, which is disposed between mirrors 1065 and 1070, to produce Ti:sapphire beam 1075 at about 740 nm. Beam combiner 1080 combines Ti:sapphire beam 1075 and third harmonic beam 1050 (reflected from mirror 1055) to produce combined beam 1085, which interacts with mixing crystal 1090 to produce output beam 1095 at about 240 nm.

2. Other Frequency-Converted Lasers Having Fundamental Wavelengths Near 720 nm

Several other types of lasers may advantageously be used to produce fundamental radiation having a wavelength near 720 nm, which can be frequency-tripled to produce an output beam having a wavelength near 240 nm.

Figure 11:
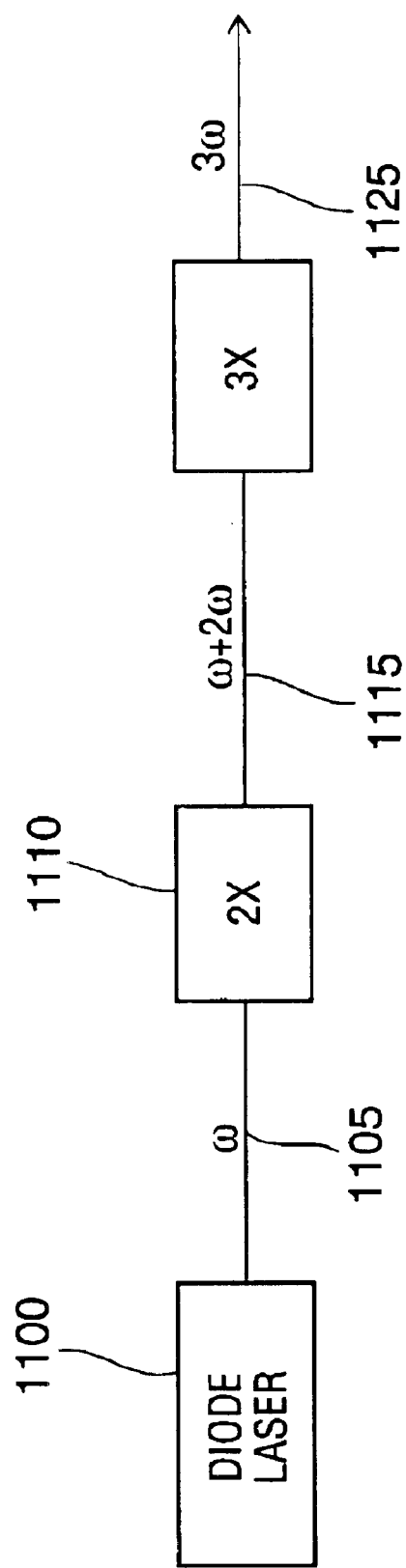
FIG. 11 illustrates an embodiment of the present invention which outputs a third harmonic beam of a pump laser.

In an exemplary embodiment shown in FIG. 11, diode laser 1100 emits fundamental beam 1105 at approximately 720 nm. Doubler crystal 1110 converts a portion of fundamental beam 1105 to second harmonic beam 1115. Tripler crystal 1120 mixes fundamental beam 1105 and second harmonic beam 1115 to produce output beam 1125 at approximately 240 nm. It is preferred that the crystals 1110 and 1120 reside inside of resonant optical cavities, to enhance the nonlinear conversion to shorter wavelengths.

For frequency conversion of diode radiation, it may be especially advantageous to use VCSEL's or optically-pumped VCSEL's as diode laser 1100, since their brightness and single transverse mode power can be higher than conventional edge-emitting diode lasers.

Other methods and apparatus may advantageously be used for producing a third harmonic with a wavelength of approximately 240 nm. In one such embodiment, a laser crystal is pumped to emit a fundamental beam at approximately 720 nm which can be frequency-tripled to produce a third harmonic beam at approximately 240 nm.

Figure 12:
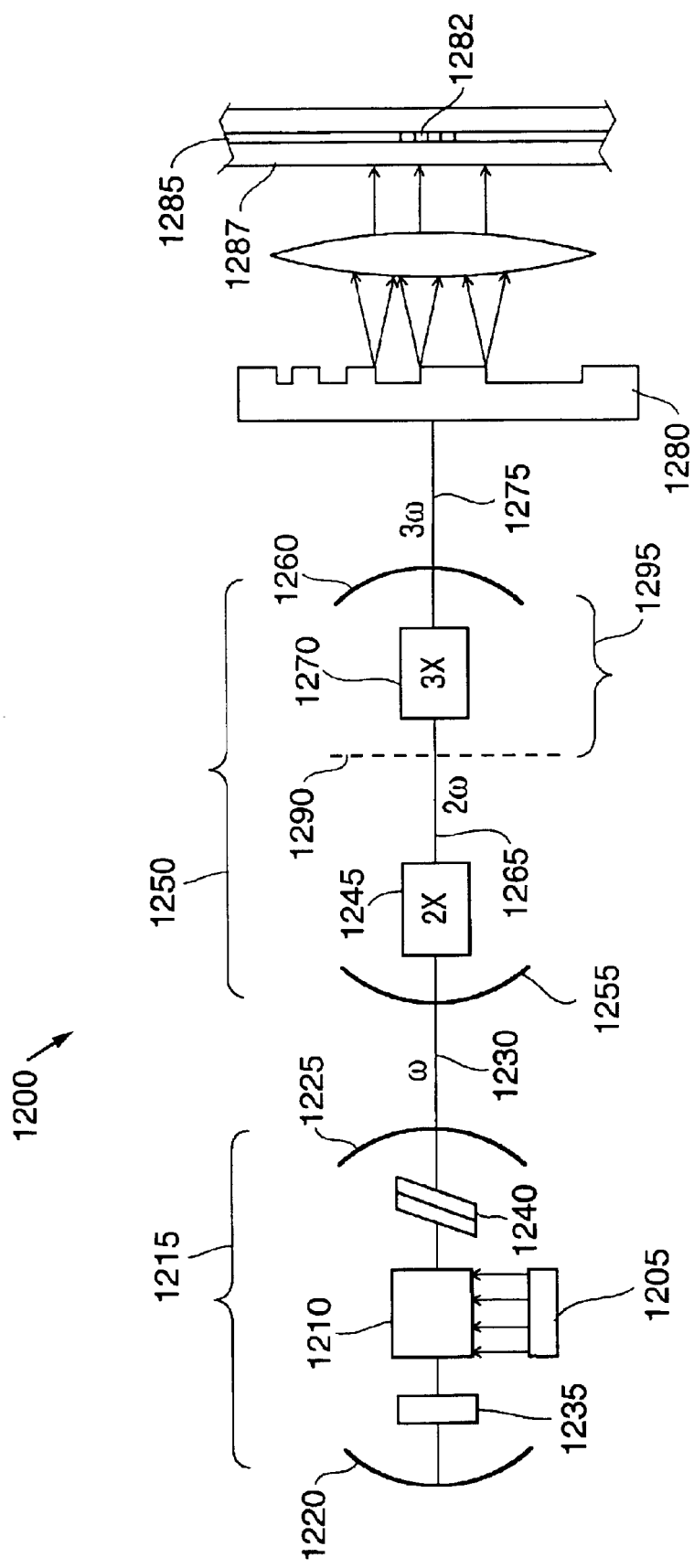
FIG. 12 illustrates an alternative embodiment of the present invention which outputs a third harmonic beam of a pump laser.

In Bragg writer 1200 of FIG. 12, pump 1205 pumps laser medium 1210, which is disposed within resonator 1215, bounded by mirrors 1220 and 1225.

Pump 1205 may be any suitable pump, including a flash lamp, but is preferably some type of diode laser with an output wavelength in the range of 630 to 670 nm. Although pump 1205 is shown side-pumping laser medium 1210, pump 1205 may also be used to end-pump laser medium 1210.

Q-switch 1235 may be operated at any convenient frequency, but is preferably operated at between 5,000 and 50,000 Hz. Proper use of Q-switch 1235 is important for all pulsed-output embodiments of the present invention in order to control the peak power of the output beam, thereby reducing damage to the optical fiber during the production of FBG's. For example, if the average output power of a solid-state laser is 1 W, a 20,000 Hz. repetition rate and 100 nanosecond (ns) pulse width results in a peak power of about 500W. If the average power is 1 W, the pulse width is 100 ns and the Q-switch is set to 5,000 Hz., the peak power is about 2,000 W. This compares favorably to the peak power of a typical excimer laser, with a repetition rate of 400 Hz. and a pulse width of 20 ns, yielding a peak power of about 125,000 W.

Etalon 1240 is also located within resonator 1215. Etalon 1240 is advantageously used with this and other embodiments of the present invention in order to control line width.

Doubler crystal 1245 is located within cavity 1250, which is defined by mirrors 1255 and 1260. Doubler crystal 1245 partially converts fundamental beam 1230 to second harmonic beam 1265, both of which interact with tripler crystal 1270 to produce third harmonic beam 1275 at a wavelength of approximately 246 nm.

In one alternative embodiment, mirror 1290 is disposed in cavity 1250 between doubler crystal 1245 and tripler crystal 1270, forming subresonator 1295.

In the embodiment shown in FIG. 12, third harmonic beam 1275 illuminates phase mask 1280 to produce FBG 1282 in doped portion 1285 of optical waveguide 1287. Alternative embodiments use other methods of producing FBG 1282 from third harmonic beam 1275, such as using phase mask 1280 as a projection mask or as a component of a phase mask interferometer. Although phase mask 1280 is shown as a chirped mask, in many embodiments phase mask 1280 is a single-period mask.

While the best mode for practicing the invention has been described in detail, those of skill in the art will recognize that there are numerous alternative designs, embodiments, modifications and applied examples which are within the scope of the present invention. Accordingly, the scope of this invention is not limited to the previously described embodiments.

We claim:

1. An apparatus for producing a Bragg grating in an optical fiber, the apparatus comprising:
   first resonator means;
   second resonator means;
   means for controlling a Ti:sapphire laser to produce an output laser beam having a wavelength in the range of approximately 230 to 250 nanometers, wherein the Ti:sapphire laser is disposed within the first resonator means, and wherein the controlling means comprises:
      means for pumping the Ti:sapphire laser with a second harmonic pump beam; and
      means for producing a third harmonic of a laser beam emitted by the Ti:sapphire laser, wherein at least a portion of the third harmonic producing means is disposed within the second resonator means; and
   means for using the output laser beam to produce the Bragg grating in the optical fiber.

2. An apparatus for producing a Bragg grating in an optical fiber, the apparatus comprising:
   means for controlling a T:sapphire laser to produce an output laser beam having a wavelength in the range of approximately 230 to 250 nanometers, wherein the controlling means further comprises:
   first resonator means;
   second resonator means, wherein the Ti:sapphire laser is disposed within the first resonator means;
   means for pumping the Ti:sapphire laser with a second harmonic pump beam;
   tripling means for generating a third harmonic beam from the second harmonic pump beam, wherein the tripling means is disposed within the second resonator means; and
   means for mixing the third harmonic beam with a beam emitted by the Ti:sapphire laser; and
   means for using the output laser beam to produce the Bragg grating in the optical fiber.

3. An apparatus for producing a Bragg grating in an optical fiber, the apparatus comprising:
   means for controlling a Ti:sapphire laser to produce an output laser beam having a wavelength in the range of approximately 230 to 250 nanometers, wherein the controlling means further comprises:
   first resonator means;
   second resonator means;
   a diode laser for pumping the Ti:sapphire laser with a second harmonic pump beam; and
   third resonator means, wherein the third harmonic means further comprises frequency doubling means and frequency tripling means, and wherein the frequency doubling means is disposed within the second resonator means and the frequency tripling means is disposed within the third resonator means; and
   means for using the output laser beam to produce the Bragg grating in the optical fiber.

4. An apparatus for producing a Bragg grating in an optical waveguide, the apparatus comprising:
   a solid state laser comprising a Ti:sapphire crystal for producing an output laser beam having a wavelength in the range of approximately 230 to 250 nanometers, wherein the solid state laser further comprises:

an active laser medium;

a pump for pumping the active laser medium to produce a fundamental beam;

a first nonlinear crystal for producing a second harmonic pump beam from the fundamental beam, wherein the Ti:sapphire crystal is pumped by the second harmonic pump beam;

a second nonlinear crystal for producing a second harmonic beam from a fundamental beam emitted by the Ti:sapphire crystal; and a third nonlinear crystal for producing a third harmonic beam by mixing the fundamental beam and the second harmonic beam; and a Bragg writer for using the output laser beam to produce the Bragg grating in the optical waveguide.

5. The apparatus of claim 4, wherein the solid state laser further comprises:

a first resonator; and a second resonator, wherein the Ti:sapphire crystal is disposed within the first resonator and wherein the second nonlinear crystal is disposed within the second resonator.

6. The apparatus of claim 5, wherein the solid state laser further comprises a third resonating cavity, and wherein said third nonlinear crystal is disposed within the third resonating cavity.

7. A method for producing a Bragg grating in an optical waveguide, the method comprising:

pumping an active laser medium to generate a fundamental pump beam;

doubling a frequency of the fundamental pump beam to generate a second harmonic pump beam;

pumping a Ti:sapphire crystal with the second harmonic pump beam;

generating a third harmonic beam from the second harmonic pump beam;

mixing the third harmonic beam with a beam emitted by the Ti:sapphire crystal to produce an output beam having a wavelength in the range of approximately 230 to 250 nanometers; and using the output beam to produce the Bragg grating in the optical waveguide.

8. An apparatus for producing a Bragg grating in an optical waveguide, the apparatus comprising:

a solid state laser comprising a Ti:sapphire laser medium, wherein the solid state laser emits an output beam having a wavelength in the range of approximately 230 to 250 nanometers; and a phase mask interferometer for using the output beam to produce the Bragg grating in the optical waveguide, wherein the phase mask interferometer comprises means for rotating the optical waveguide.

9. An apparatus for producing a Bragg grating in an optical waveguide, the apparatus comprising:

a solid state laser comprising a Ti:sapphire laser medium, wherein the solid state laser emits an output beam having a wavelength in the range of approximately 230 to 250 nanometers; and phase mask projection means for using the output beam to produce the Bragg grating in the optical waveguide.

10. An apparatus for producing a Bragg grating in an optical waveguide, the apparatus comprising:

a laser medium;

a pump for stimulating the laser medium to emit a fundamental pump beam;

a doubler crystal for doubling the frequency of the fundamental beam to produce a second harmonic pump beam;

a solid state laser comprising a Ti:sapphire laser medium which is pumped by the second harmonic pump beam to emit a fundamental beam;

at least one nonlinear crystal for producing a harmonic beam from the fundamental beam, the harmonic beam having a wavelength in the range of approximately 230 to 250 nanometers;

a processor;

means for actuating wavelength control elements according to control signals from the processor;

means for measuring a wavelength of the harmonic beam and for sending a measurement signal to the processor;

a control for sending a wavelength signal to the processor, the wavelength signal indicating a desired wavelength of the harmonic beam; and Bragg writing means for using the harmonic beam to produce the Bragg grating in the optical waveguide, wherein the processor controls the rotation means and the temperature control means such that an actual wavelength of the harmonic beam is within a predetermined number of nanometers of the desired wavelength.

11. The apparatus of claim 10, wherein the wavelength control elements are selected from the group consisting of gratings, prisms, etalons and birefringent filters.

* * * * *